Patented Mar. 29, 1938

UNITED STATES PATENT OFFICE 2,112,728

METHOD OF ENHANCING THE ELASTICITY AND SOFTNESS OF ALBUMINOUS ARTIFICIAL STUFFS

Stefan Morgenstern, Berlin-Charlottenburg, and Johann Eggert, Berlin, Germany, assignors to Deutsche Hydrierwerke Aktiengesellschaft, Berlin-Charlottenburg, Germany, a corporation of Germany No Drawing. Application July 31, 1935, Serial No. 34,030. In Germany July 31, 1934

7 Claims. (Cl. 106—38)

It is not new in the manufacture of products consisting of albuminous materials such as gelatine, size, casein and the like, or of artificial materials containing the aforesaid albuminous materials, that organic compounds are usefully added, before bringing those materials into final form, in order to obtain a good softness, suppleness and elasticity. Among those compounds glycerol is the best known and most employed for this effect. But there are also derivatives of the latter, particularly ethers and esters to be considered as well as high molecular aliphatic, aromatic or cyclo-aliphatic alcohols and cyclic hydroxyl-substituted ethers which may also contain several oxygen atoms in the ring and one or more side chains and their ethers and esters, respectively. Though those compounds have the power of enhancing the softness of albuminous products, they are, however, incapable of improving also their elasticity in a satisfactory manner. Especially with the usual reagents it is not possible to obtain an elasticity and suppleness resembling that of a soft leather.

Now it has been found that the elasticity and suppleness of albuminous products such as size, gelatine, casein, albumin or the like are remarkably enhanced by applying besides the well-known softening agents additional organic compounds of the general formula $R—X—R_1(Y)n$. In this formula R means a higher molecular aliphatic or cycloaliphatic radical with no less than 6 C-atoms; $R_1$ means an aliphatic, cycloaliphatic or aromatic residue, X an interruption of the carbon chain by hetero-atoms or -groups hereinafter disclosed and Y a salt-forming group being present at least once and consisting of e. g. a sulfonic acid group, a thio-sulfonic acid group, a sulfuric acid ester group, a thio-sulfuric acid ester group, a phosphoric acid ester group or, alternatively their salts formed by means of inorganic or organic bases. R means particularly the alkyl radicals of higher molecular aliphatic alcohols e. g. of octyl-, dodecyl-, myristyl-, cetyl-, octadecyl- or of oleyl or ricinoleyl alcohol or mixtures of those radicals or of cyclo-aliphatic alcohols such as naphthenic alcohols or cyclohexyl-alcohols respectively, while $R_1$ may be of an aliphatic, cyclo-aliphatic or aromatic nature or also substituted by quite heterogeneous groups such as hydroxyl-, ether-, sulfo-groups, alkyl- or aryl-residues. Hetero-atoms or hetero-groups respectively connecting the radicals R and $R_1$ with one another, are: O, NH, S, $SO_2$, $SO_2NH$, and the like, wherein the hydrogen atom may also be substituted.

The manufacture of said compounds is practicable in the well-known ways and in various manners, for example by causing the halogenides of higher molecular aliphatic or cyclo-aliphatic hydrocarbons, sulfonic acids or carbon acids to react upon alkyl-sulfonic or alkyl sulfuric acids containing hydroxyl- or amido-groups, or upon their thio-derivates. As compounds of this kind there may be named e. g. the sulfuric acid ester of the mono-glycerine dodecyl-ether, the N-lauroyl-amido-ethane-sulfuric acid, the cetyl-thio-ethane-sulfonic acid, the 1-cetyl-hexyl-ether of the decane-10-sulfonic acid, the thio-sulfuric acid ester of the oleyl-ethylene-glycol-ether or, respectively, of their neutralization products obtainable by means of inorganic or organic bases.

Example 1

Add to a 30% gelatine melt 10% of a condensation product made of 15 parts by weight of adipic acid and 25 parts by weight of glycerine by heating up to 150–160°, 8% of glycerine-di-oxy-ethyl-ether and 3% of the sodium salt of the dodecyl-monoglycerine-ether-sulfonate. Products obtainable from this melt, such as foils, are of an elasticity resembling that of a soft leather.

Example 2

With a 30% gelatine melt one admixes 10% of cyclohexanone-glycerine, 5% of ammonium salt of the cocoa-fat acid ester of the 6-oxy-hexane-sulfonic acid and 10% of Turkey-red-oil. A homogeneous mass substantially free of any air bubbles is easily formed, and already at 35° it permits good forming.

Example 3

By adding to a 30% gelatine melt 7% of cyclohexylamine salt of the sulfuric acid ester of the 1,6-hexandiol, 10% of the glycerine-adipic acid-condensation product as described in Example 1), 3% of tetrahydro-furfuryl-acetate and 3% of oleic acid ammonium salt, the gelatine melt remains free of any skin-formation and it gives very smooth and elastic products.

What we claim is:

1. The method of manufacture of elastic products which comprises the addition to albuminous materials of softening means and a compound of the general formula $R—X—R_1(Y)n$, in which R represents a higher molecular aliphatic or cyclo aliphatic radical having at least 6 carbon atoms, $R_1$ represents an aliphatic, cyclo-aliphatic or aromatic radical or such a radical containing substituted groups of the group consisting of hydroxyl, ether, sulfo groups, alkyl and aryl groups, X represents a hetero atom or group of the group consisting of O, NH, S, $SO_2$, $SO_2NH$, and Y represents a radical of the group consisting of the sulfonic acid group, the thio-sulfonic acid group, the sulfuric ester group, the thiosulfuric ester group, and the phosphoric ester group in which a hydrogen atom may be replaced by an inorganic or organic base and $n$ represents at least 1, to produce an elastic supple product.

2. An elastic and supple composition of matter comprising as its principal ingredients an albuminous material of the group consisting of gelatine, size and casein and artificial materials containing the same, a softening material and material of the general formula $R-X-R_1(Y)_n$, in which R represents a higher molecular aliphatic or cyclo aliphatic radical having at least 6 carbon atoms, $R_1$ represents an aliphatic, cycloaliphatic or aromatic radical or such a radical containing substituted groups of the group consisting of hydroxyl, ether, sulfo groups, alkyl and aryl groups, X represents a hetero atom or group of the group consisting of O, NH, S, $SO_2$, $SO_2NH$, and Y represents a radical of the group consisting of the sulfonic acid group, the thiosulfonic acid group, the sulfuric ester group, the thio-sulfuric ester group and the phosphoric ester group in which a hydrogen atom may be replaced by an inorganic or organic base and $n$ represents at least 1.

3. An elastic and supple composition of matter comprising as its principal ingredients an albuminous material of the group consisting of gelatine, size and casein and artificial materials containing the same, a softening material and material of the general formula $R-X-R_1(Y)_n$, in which R represents an alkyl radical of a high molecular aliphatic alcohol having 8 to 18 carbon atoms, $R_1$ represents an aliphatic radical, X a hetero atom or group and Y a radical of a polybasic acid.

4. An elastic and supple composition of matter comprising as its principal ingredients an albuminous material of the group consisting of gelatine, size and casein and artificial materials containing the same, a softening material and material of the general formula $R-X-R_1(Y)_n$, in which R represents an alkyl radical of a high molecular aliphatic alcohol having 8 to 18 carbon atoms, $R_1$ represents a cyclo aliphatic radical, X a hetero atom or group and Y a radical of a polybasic acid.

5. An elastic and supple composition of matter comprising as its principal ingredients an albuminous material of the group consisting of gelatine, size and casein and artificial materials containing the same, a softening material and material of the general formula $R-X-R_1(Y)_n$, in which R represents an alkyl radical of a high molecular aliphatic alcohol having 8 to 18 carbon atoms, $R_1$ represents an aromatic radical, X a hetero atom or group and Y a radical of a polybasic acid.

6. An elastic and supple composition of matter consisting essentially of an albuminous material, a softening agent for said material and a compound of the group consisting of the sulfuric acid ester of monoglycerine dodecyl ether, the n-lauryl amido ethane sulfuric acid, the cetyl thioethane sulfonic acid, the 1-cetyl hexyl ether of dodecane-10-sulfonic acid, the thiosulfonic acid ester of oleyl ethylene glycol ether and their neutralization products obtainable by the action of inorganic or organic bases.

7. An elastic and supple composition of matter consisting essentially of an albuminous material, a softening agent for said material selected from the group consisting of higher molecular aliphatic, aromatic or cycloaliphatic alcohols, cyclic hydroxyl substituted ethers, with one or more oxygen atoms and one or more side chains in the ring, and the ethers and esters of these compounds, and a third ingredient consisting of a compound of the general formula $R-X-R_1(Y)_n$ as described in claim 1.

JOHANN EGGERT.
STEFAN MORGENSTERN.